US010410331B2

(12) United States Patent
Jimenz, Jr. et al.

(10) Patent No.: US 10,410,331 B2
(45) Date of Patent: Sep. 10, 2019

(54) COMPUTED TOMOGRAPHY OBJECT INSPECTION SYSTEM

(71) Applicant: National Technology & Engineering Solutions of Sandia, LLC, Albuquerque, NM (US)

(72) Inventors: Edward Steven Jimenz, Jr., Albuquerque, NM (US); Rahul Nunna, Fresno, CA (US); Tod Tracy Amon, Sandia Park, NM (US); Kyle R. Thompson, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 169 days.

(21) Appl. No.: 15/280,061

(22) Filed: Sep. 29, 2016

(65) Prior Publication Data
US 2018/0089819 A1    Mar. 29, 2018

(51) Int. Cl.
*G06T 7/00* (2017.01)
*G06T 19/00* (2011.01)
*G06F 3/0481* (2013.01)

(52) U.S. Cl.
CPC ........ *G06T 7/0004* (2013.01); *G06F 3/04815* (2013.01); *G06T 19/00* (2013.01); *G06T 7/001* (2013.01); *G06T 2200/04* (2013.01); *G06T 2200/24* (2013.01); *G06T 2207/10072* (2013.01); *G06T 2207/10081* (2013.01); *G06T 2207/10104* (2013.01);
(Continued)

(58) Field of Classification Search
CPC .............................. G06T 7/0004; G06F 3/048

USPC ......................................................... 382/141
See application file for complete search history.

(56) References Cited

U.S. PATENT DOCUMENTS

2012/0057765 A1* 3/2012 Ei-Zehiry ............... G06T 5/002
382/128
2014/0218397 A1* 8/2014 Rutman ................ G06T 3/4092
345/632
(Continued)

OTHER PUBLICATIONS

"Industrial computed tomography," Wikipedia Foundation, Inc., Wikipedia, last modified Dec. 17, 2015, 4 pages, accessed Jul. 11, 2016. http://en.wikipedia.org/wiki/Industrial_computed_tomography.

*Primary Examiner* — Justin P. Misleh
(74) *Attorney, Agent, or Firm* — Yee & Associates, P.C.; Gregory M. Doudnikoff

(57) ABSTRACT

A method and apparatus for inspecting an object in a virtual reality environment. Computed tomography scan data for the object is identified. A first group of dimensions for a model of the object and a second group of dimensions for the computed tomography scan data for the object are adjusted such that the first group of dimensions for a first group of features in the model corresponds to the second group of dimensions for a second group of features in the computed tomography scan data. The model and the computed tomography scan data are displayed by a game engine in the virtual reality environment on a display system. Graphical indicators in the virtual reality environment are displayed when a difference is present between features in the model and the features in the computed tomography scan data, enabling identifying the difference between the object and the model of the object.

20 Claims, 11 Drawing Sheets

(52) U.S. Cl.
CPC ............... *G06T 2207/10108* (2013.01); *G06T 2207/30108* (2013.01); *G06T 2207/30164* (2013.01); *G06T 2219/00* (2013.01)

(56) References Cited

U.S. PATENT DOCUMENTS

| | | | |
|---|---|---|---|
| 2014/0350618 A1* | 11/2014 | Warren | A61B 5/0424 |
| | | | 607/7 |
| 2015/0243086 A1* | 8/2015 | Denis | G06T 19/006 |
| | | | 345/633 |
| 2015/0260474 A1 | 9/2015 | Rublowsky et al. | |
| 2015/0350618 A1* | 12/2015 | Meier | H04N 9/3185 |
| | | | 345/7 |
| 2017/0066135 A1* | 3/2017 | Cohen | B25J 9/1689 |

\* cited by examiner

COMPUTED TOMOGRAPHY OBJECT INSPECTION SYSTEM

GOVERNMENT LICENSE RIGHTS

This invention was made with United States Government support under Contract No. DE-AC04-94AL85000 between Sandia Corporation and the United States Department of Energy. The United States Government has certain rights in this invention.

BACKGROUND INFORMATION

1. Field

The present disclosure relates generally to an improved computed tomography object inspection system and, in particular, to a method and apparatus for inspecting an object in a virtual reality environment.

2. Background

Computed tomography (CT) scans employ computer process combinations of many X-ray images taken from different angles to produce cross-sectional images of an object. These cross-sectional images may also be referred to as tomographic images which are virtual slices of specific areas of an object. In this manner, the viewer may see the inside of the object without actually cutting the object.

The computed tomography scans typically employ X-rays and are used for many purposes including medical imaging. Medical imaging is the most common use of the computed tomography scans. The computed tomography scans may be also used in other industries such as for inspection of components. The inspections may be used to locate imperfections such as voids, cracks, or other types of defects. The imperfections may also include deviations from desired dimensions.

Currently, a computed tomography scan is viewed in two-dimensional slices. The two-dimensional slices may be viewed and analyzed to inspect the object for imperfections. Viewing the slices may be more tedious and time consuming than desired.

Therefore, it would be desirable to have a method and apparatus that take into account at least some of the issues discussed above, as well as other possible issues. For example, it would be desirable to have a method and apparatus that overcome a technical problem with inspecting an object.

SUMMARY

An embodiment of the present disclosure provides a method for inspecting an object in a virtual reality environment. Computed tomography scan data for the object is identified by a computer system. A first group of dimensions for a model of the object and a second group of dimensions for the computed tomography scan data for the object are adjusted by the computer system such that the first group of dimensions for a first group of features in the model corresponds to the second group of dimensions for a second group of features in the computed tomography scan data for the object. The model of the object and the computed tomography scan data for the object are displayed by a game engine running on the computer system in the virtual reality environment on a display system. A group of graphical indicators in the virtual reality environment are displayed by the game engine running on the computer system when a difference is present between features in the model and the features in the computed tomography scan data, enabling identifying the difference between the object and the model of the object.

Another embodiment of the present disclosure provides an object inspection system. The object inspection system comprises a display system and an analyzer in communication with the display system. The analyzer is configured to identify a computed tomography scan data for the object. Also, the analyzer is configured to adjust a first group of dimensions for a model of the object and a second group of dimensions for the computed tomography scan data for the object such that the first group of dimensions for a first group of features in the model correspond to the second group of dimensions for a second group of features in the computed tomography scan data for the object. Yet also, the analyzer is configured to display the model of the object and the computed tomography scan data for the object in a virtual reality environment on a display system. Still also, the analyzer is configured to display a group of graphical indicators in the virtual reality environment when a difference is present between the features in the model and the features in the computed tomography scan data, enabling identifying difference between object and the model of the object.

Yet another embodiment of the present disclosure provides an object inspection system. The object inspection system is comprised of a computed tomography scanner that is configured to generate computed tomography scan data for an object, a display system, and an analyzer in communication with the display system. The analyzer is configured to adjust a first group of dimensions a model of the object and a second group of dimensions for the computed tomography scan data for the object such that the first group of dimensions for a first group of features in the model correspond to a second group of dimensions for a second group of features in the computed tomography scan data for the object. Also, the analyzer is configured to display the model of the object and the computed tomography scan data for the object in a virtual reality environment on a display system using a game engine. Yet also, the analyzer is configured to display a group of graphical indicators in the virtual reality environment using the game engine when a difference is present between the features in the model and the features in the computed tomography scan data, enabling identifying difference between object and the model of the object.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that inspecting objects may be more difficult than the when determining whether the objects meet specifications. The illustrative embodiments recognize and take into account that it would be desirable to have an improved method and apparatus for comparing the objects to design specifications. The illustrative embodiments recognize and take into account that one manner in which a comparison may be made is by comparing computed tomography scans for the objects to models for the objects.

Thus, the illustrative embodiments provide a method and apparatus for inspecting objects. For example, the method is presented in one illustrative example for inspecting an object in a virtual reality environment. A computer system identifies computed tomography scan data for the object. The computer system adjusts a group of dimensions between a model of the object and the computed tomography scan data for the object such that the dimensions for a group of features in the model correspond to the group of features in the computed tomography scan data for the object. A game engine running on the computer system displays the model of the object and the computed tomography scan data for the object in the virtual reality environment on a display system. The game engine running on the computer system displays a group of graphical indicators in the virtual reality environment when a difference is present between the features in the model and the features in the computed tomography scan data, enabling identifying differences between the object and the model of the object.

As used herein, "a group of", when used with reference to items, means one or more items. For example, "a group of dimensions" is one or more dimensions.

Figure 1:
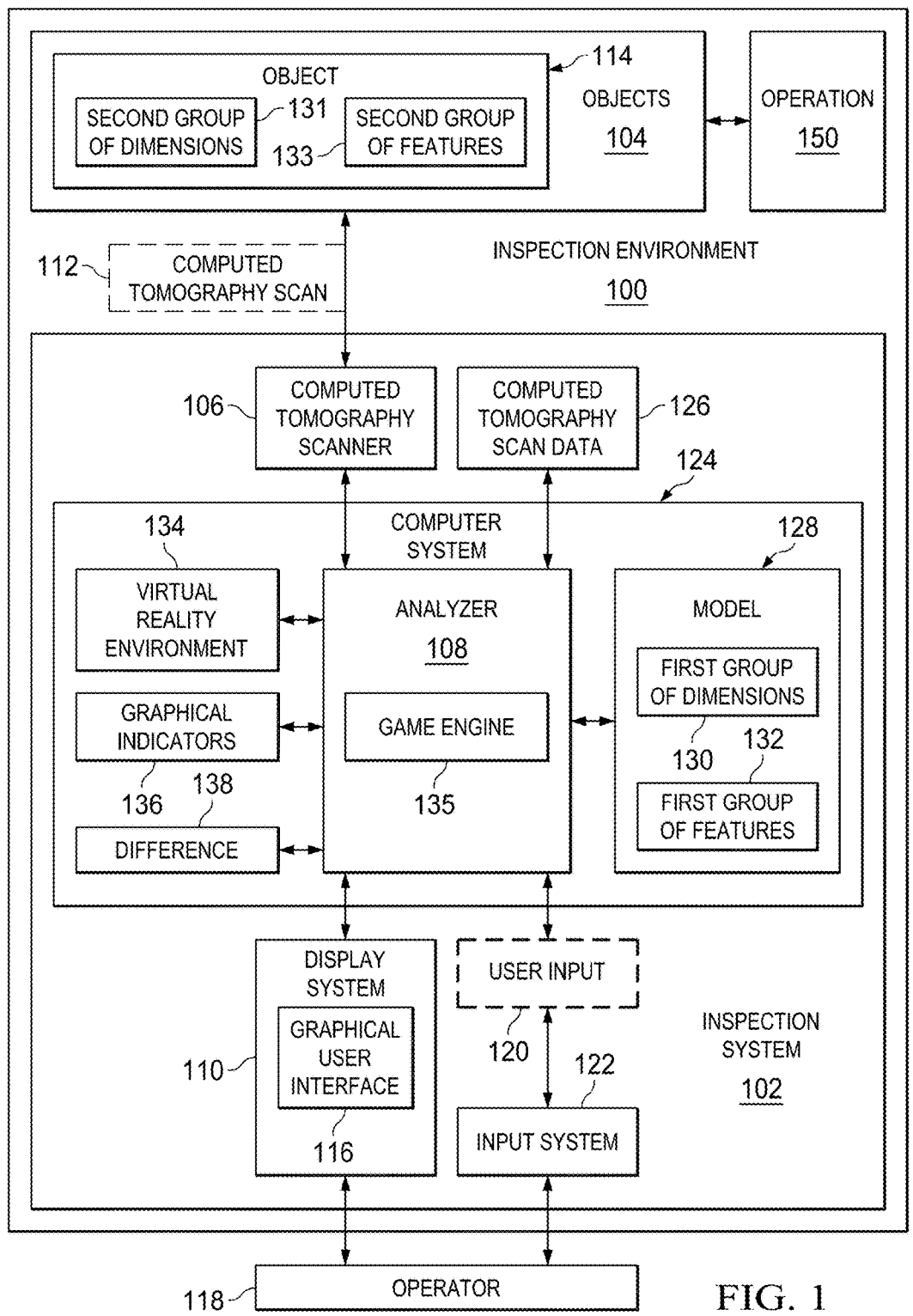
FIG. 1 is an illustration of a block diagram of an inspection environment in accordance with an illustrative embodiment.

With reference now to the figures and, in particular, with reference to FIG. 1, an illustration of a block diagram of an inspection environment is depicted in accordance with an illustrative embodiment. As depicted, inspection environment 100 includes inspection system 102, which operates to inspect objects 104.

In this illustrative example, inspection system 102 is comprised of a number of different components. As depicted, inspection system 102 comprises computed tomography (CT) scanner 106, analyzer 108, and display system 110.

In this illustrative example, computed tomography scanner 106 is a hardware system that operates to scan object 114 and generates computed tomography scan 112 for object 114 in objects 104. As depicted, computed tomography scanner 106 may generate computed tomography scan 112 using a number of different types of energy. For example, computed tomography scanner 106 may use at least one of X-rays, positron emissions, photons, or other types of energy. As depicted, computed tomography scanner 106 may be selected from one of an X-ray computed tomography (X-ray CT) scanner, a positron emission tomography (PET) scanner, a single-photon emission computed tomography (SPECT) scanner, or some other suitable type of scanner.

Further, computed tomography scanner 106 may use various types of scanning mechanisms. For example, computed tomography scanner 106 may use at least one of a fan scanner, a line scanner, a cone beam scanner, or some other suitable type of scanning mechanism.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, object 114 may take various forms. For example, object 114 may be selected from one of a hardware structure, an assembly, a part, a consumer electronics device, a biological structure, a chip, a camera system, or some other suitable type of object.

In this illustrative example, display system 110 is a physical hardware system and includes one or more display devices on which graphical user interface 116 may be displayed. The display devices in display system 110 may be selected from at least one of a head-mounted display, video eyeglasses, a display screen, smart glasses, or some other suitable type of display device. These types of display devices may include at least one of a light emitting diode (LED) display, a liquid crystal display (LCD), an organic light emitting diode (OLED) display, or some other suitable device on which graphical user interface 116 can be displayed. Operator 118 is a person that may interact with graphical user interface 116 through user input 120 generated by input system 122 for computer system 124. Input system 122 is a physical hardware system and may be selected from at least one of a mouse, a keyboard, a trackball, a touchscreen, a stylus, a motion sensing input device, a cyber glove, or some other suitable type of input device.

As depicted, analyzer 108 is in communication with display system 110. Analyzer 108 is configured to identify computed tomography scan data 126 for computed tomography scan 112 for object 114. Computed tomography scan data 126 is generated by computed tomography scanner 106 and is the data that forms computed tomography scan 112.

In this illustrative example, analyzer 108 compares object 114 to model 128 of object 114. In making the comparison, however, first group of dimensions 130 between model 128 and second group of dimensions 131 for object 114, as represented in computed tomography scan data 126, may not match sufficiently to perform the comparison.

Analyzer 108 adjusts first group of dimensions 130 in model 128 of object 114 and second group of dimensions 131 in computed tomography scan data 126 for object 114. The adjustment is made such that first group of dimensions 130 for first group of features 132 in model 128 corresponds to second group of dimensions 131 for second group of features 133 in computed tomography scan data 126 for object 114. In the illustrative example, first group of features 132 and second group of features 133 correspond to each other. Additionally, first group of features 132 and second group of features 133 are some or all of the features for object 114 as represented in model 128 and in computed tomography scan data 126. In this illustrative example, the features in first group of features 132 and second group of features 133 between model 128 and in computed tomography scan data 126 may be selected from at least one of a part, a surface of a structure, a protrusion, a hole, an angle, a wire, a trace line, a pin, a component, a cable, a motor, an integrated circuit chip, a panel, a joint, a seam, or some other feature in object 114.

Analyzer 108 displays model 128 of object 114 and computed tomography scan data 126 for object 114 in virtual reality environment 134 on display system 110. Further, analyzer 108 also displays a group of graphical indicators 136 in virtual reality environment 134 when difference 138 is present between first group of features 132 in model 128 and second group of features 133 in computed tomography scan data 126. As depicted, the display of model 128 and computed tomography scan data 126 in virtual reality environment 134 is formed using game engine 135.

As depicted, game engine 135 may directly display virtual reality environment 134. Alternatively, the data for virtual reality environment 134 may be received by analyzer 108, which in turn performs the display of virtual reality environment 134.

Game engine 135 is a software framework typically used for creation and development of video games. Game engine 135 includes rendering engine ("renderer") for 2-D or 3-D graphics, a physics engine. Game engine 135 also includes at least one of collision detection, collision response, sound, scripting, animation, artificial intelligence, networking, streaming, memory management, threading, localization support, scene graph, video support for cinematics, or other suitable components.

In this illustrative example, game engine 135 is used to display computed tomography scan data 126 for computed tomography scan 112. Game engine 135 may be implemented using any currently available game engine. For example, game engine 135 may be implemented using the Unreal Engine from Epic Games, Inc., the Unity game engine from Unity Technologies SD, CryEngine from Crytek, Stingray from Autodesk, Inc., Maxplay game engine from Maximum Play, Inc., Amazon Lumberyard from Amazon.com, Inc., or another suitable game engine.

In this illustrative example, the display of virtual reality environment 134 is performed in a manner that provides for immersion of operator 118 into virtual reality environment 134. This immersion may be performed using display system 110 in which display system 110 may be configured to restrict the view of operator 118 such that slightly different images are displayed to each eye of operator 118. In this manner, a three-dimensional view is present in virtual reality environment 134.

In this illustrative example, analyzer 108 identifies difference 138. Analyzer 108 enables identifying difference 138 between object 114 in computed tomography scan data 126 and model 128 of object 114.

As depicted, in displaying model 128 of object 114 and computed tomography scan data 126 for object 114 in virtual reality environment 134 on display system 110, model 128 and computed tomography scan data 126 may be overlaid with each other in virtual reality environment 134. In other words, model 128 and computed tomography scan data 126 may be superimposed with each other. In yet another example, model 128 and computed tomography scan data 126 may be displayed adjacent to each other in virtual reality environment 134.

Analyzer 108 may be implemented in software, hardware, firmware, or a combination thereof. When software is used, the operations performed by analyzer 108 may be implemented in program code configured to run on hardware, such as a processor unit. When firmware is used, the operations performed by analyzer 108 may be implemented in program code and data and stored in persistent memory to run on a processor unit. When hardware is employed, the hardware may include circuits that operate to perform the operations in analyzer 108.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Computer system 124 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

In one illustrative example, one or more technical solutions are present that overcome a technical problem with inspecting an object. As a result, one or more technical solutions in the illustrative examples may provide a technical effect of making an inspection of the object easier to view and analyze by a human operator. In one or more technical solutions, the technical effect of graphically indicating differences between model 128 of object 114 and computed tomography scan data 126 for object 114 is present. In the illustrative example, model 114 has desired dimensions and features for object 114. Computed tomography scan data 126 is generated from scanning of object 114 and has the actual dimensions and features present for object 114. In the illustrative example, game engine 135 is utilized to display model 128 and computed tomography scan data 126 in virtual reality environment 134. In this manner, operator 118 may view model 128 and computed tomography scan data 126 within virtual reality environment 134 to perform an inspection of object 114.

As a result, computer system 124 operates as a special purpose computer system in which analyzer 108 in computer system 124 enables viewing model 128 of object 114 and computed tomography scan data 126 of object 114. In particular, analyzer 108 transforms computer system 124 into a special purpose computer system as compared to currently available general computer systems that do not have analyzer 108.

Based on identifying at least one of whether difference 138 is present or what difference 138 is when difference 138 is present, operation 150 may be performed for object 114. Operation 150 may include at least one of reworking of object 114, discarding of object 114, changing model 128 for object 114, or some other operation related to object 114.

Figure 2:
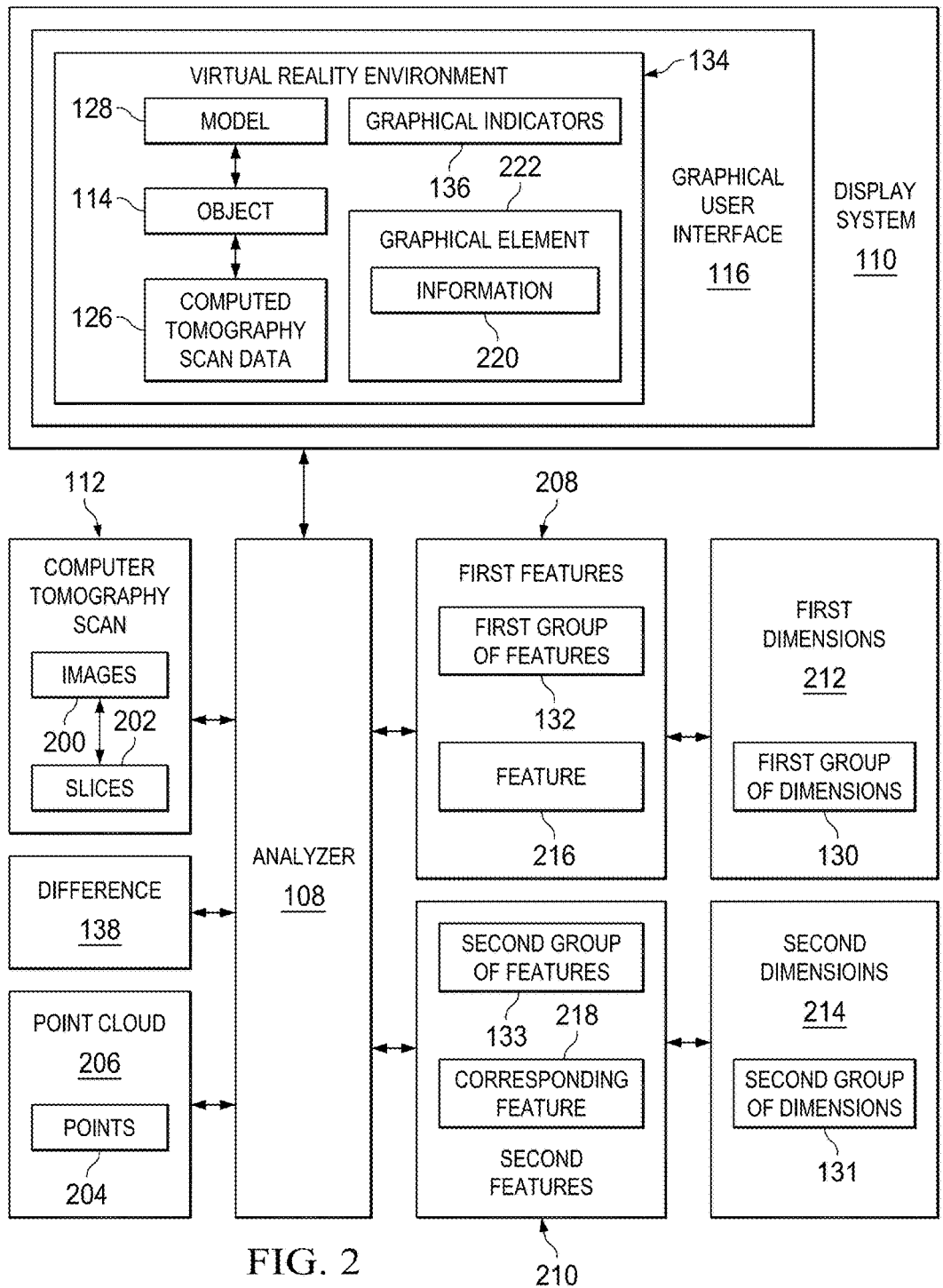
FIG. 2 is an illustration of a block diagram of using dataflow in identifying differences between a model of an object and computed tomography scan data for the object in accordance with an illustrative embodiment.

With reference now to FIG. 2, an illustration of a block diagram of using dataflow in identifying differences between a model of an object and computed tomography scan data for the object is depicted in accordance with an illustrative embodiment. In the illustrative examples, the same reference numeral may be used in more than one figure. This reuse of a reference numeral in different figures represents the same element in the different figures.

In this illustrative example, analyzer 108 identifies computed tomography scan data 126 for object 114. Computed tomography scan data 126 may be received in computed tomography scan 112. For example, computed tomography scan data 126 may comprise images 200 that represent slices 202 of object 114 that are generated by computed tomography scanner 106 in FIG. 1.

Analyzer 108 may use images 202 as computed tomography scan data 126. Alternatively, analyzer 108 may generate points 204 for point cloud 206 from images 200 to form computed tomography scan data 126.

In this illustrative example, analyzer 108 scales at least one of first group of dimensions 130 for first group of features 132 in model 128 or second group of dimensions 131 for second group of features 133 in computed tomography scan data 126. The scaling is performed such that first group of dimensions 130 and second group of dimensions 131 match each other. This matching enables identifying difference 138 between model 128 and computed tomography scan data 126 with respect to first group of dimensions 130 and second group of dimensions 131. In addition, difference 138 may be identified between all of first dimensions 212 in model 128 and second dimensions 214 in computed tomography scan data 126.

As depicted, difference 138 may be identified in a number of ways. In one illustrative example, a comparison of first dimensions 212 for first features 208 and second dimensions 214 for second features 210 is made. For example, first dimensions 212 for feature 216 in first features 208 is compared to second dimensions 214 for corresponding feature 218 in second features 210. Difference 138 in this comparison may be indicated by using a group of graphical indicators 136. The group of graphical indicators 136 is displayed in virtual reality environment 134 along with the display of model 128 and computed tomography scan data 126 for object 114 in virtual reality environment 134 in graphical user interface 116 on display system 110.

In this illustrative example, the group of graphical indicators 136 may take various forms. For example, the group of graphical indicators 136 may be selected from at least one of color, bolding, line thickness, text, an icon, a graphic, or some other suitable type of graphical indicator that draws attention to difference 138 between model 128 and computed tomography scan data 126 for object 114 in virtual reality environment 134.

As another depicted example, information 220 about difference 138 may also be displayed within virtual reality environment 134. For example, information 220 may be displayed within virtual reality environment 134 using graphical element 222. Graphical element 222 may be selected from one of a pop-up, a tool tip, a window, a frame, or some other suitable type of graphical element in which information 220 may be displayed.

Figure 3:
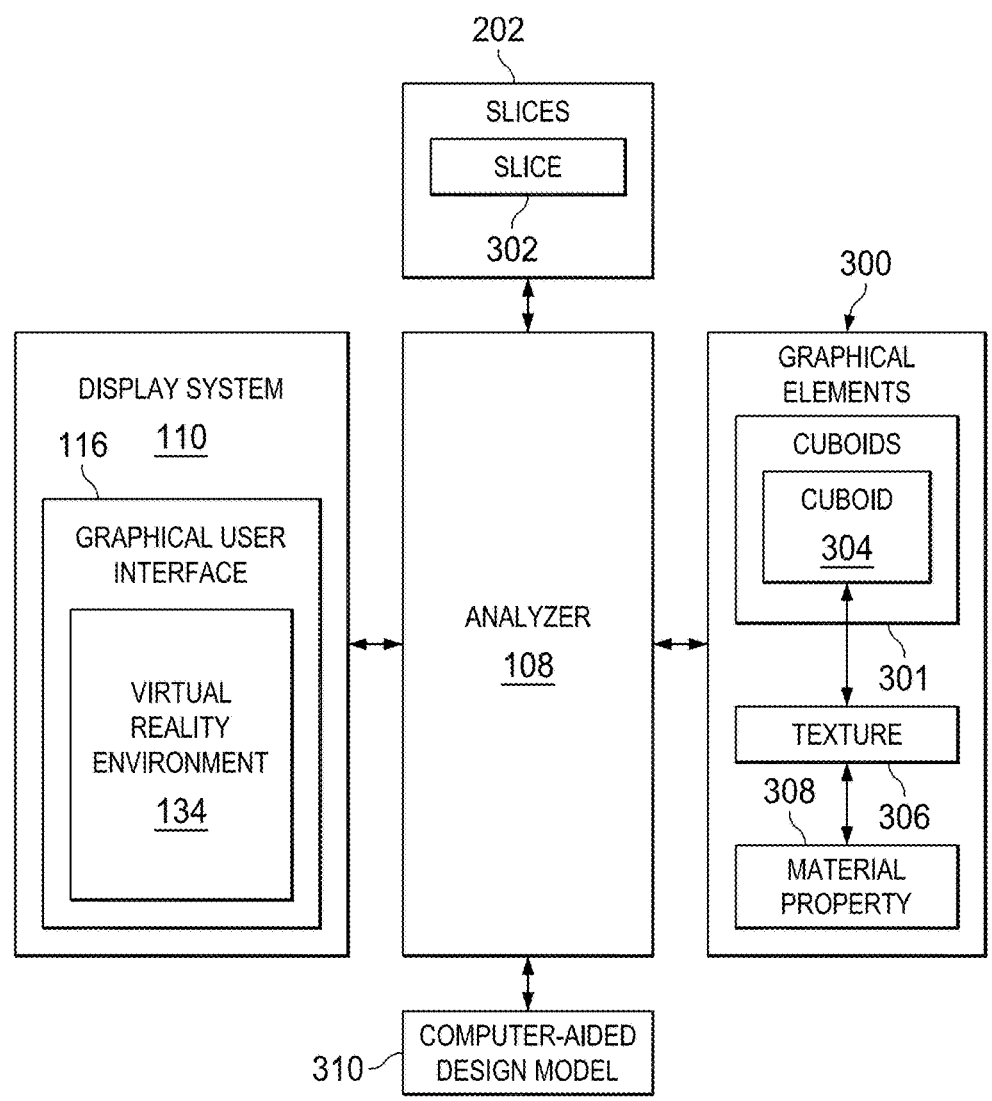
FIG. 3 is an illustration of a block diagram of dataflow used to display computed tomography scan data and a model of an object in a virtual reality environment in accordance with an illustrative embodiment.

With reference now to FIG. 3, an illustration of dataflow used to display computed tomography scan data and a model of an object in a virtual reality environment is depicted in accordance with an illustrative embodiment. The dataflow in FIG. 3 may be used by analyzer 108 to display computed tomography scan data 126 and model 128 in FIGS. 1-2 within virtual reality environment 134.

In the illustrative example, computed tomography scan data 126 comprises slices 202 for object 114 in FIGS. 1-2. Analyzer 108 processes slices 202 that are processed to create graphical elements 300 that may be displayed by game engine 135 in FIG. 1 within virtual reality environment 134.

In the illustrative example, slices 202 may be converted to graphical elements 300 in the form of cuboids 301. For example, slice 302 in slices 202 is processed to form cuboid 304 in cuboids 301. As depicted, slice 302 is treated as texture 306, and texture 306 is attached to material property 308. Texture 306 with material property 308 is placed into cuboid 304 in cuboids 301. In this illustrative example, the information in slice 302 is sent to game engine 135 in FIG. 1 using texture 306 and material property 308 when game engine 135 takes the form of the Unreal Engine. The information in slice 302 may be sent to game engine 135 using other techniques when other types of game engines are used. In this illustrative example, computed tomography scan data 126 in FIGS. 1-2 is displayed by game engine 135 in FIG. 1 in virtual reality environment 134 through displaying graphical elements 300 that represent slices 202 for object 114 in FIGS. 1-2.

Additionally, model 128 in FIGS. 1-2 is computer-aided design (CAD) model 310 in this example and is displayed by game engine 135. Depending on the format of computer-aided design model 310 and the type of game engine 135 used, computer-aided design model 310 may be displayed by game engine 135 in virtual reality environment 134 without needing additional processing or modifications to place computer-aided design model 310 into a form that can be displayed by game engine 135. For example, graphical elements 300 for computer-aided design model 310 may be converted into a format used in graphical elements 300 that are displayed by game engine 135.

In this manner, analyzer 108 displays model 128 in FIGS. 1-2 in the form of computer-aided design model 310 and computed tomography scan data 126 in FIGS. 1-2 is converted into graphical elements 300 in virtual reality environment 134 using game engine 135.

The illustration of inspection environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, game engine 135 is shown as a component that is part of analyzer 108. In other illustrative examples, game engine 135 may be a separate component that analyzer 108 communicates with to display virtual reality environment 134. As another example, analyzer 108 may also remove a noise in computed tomography scan data 126 for object 114.

Figure 4:
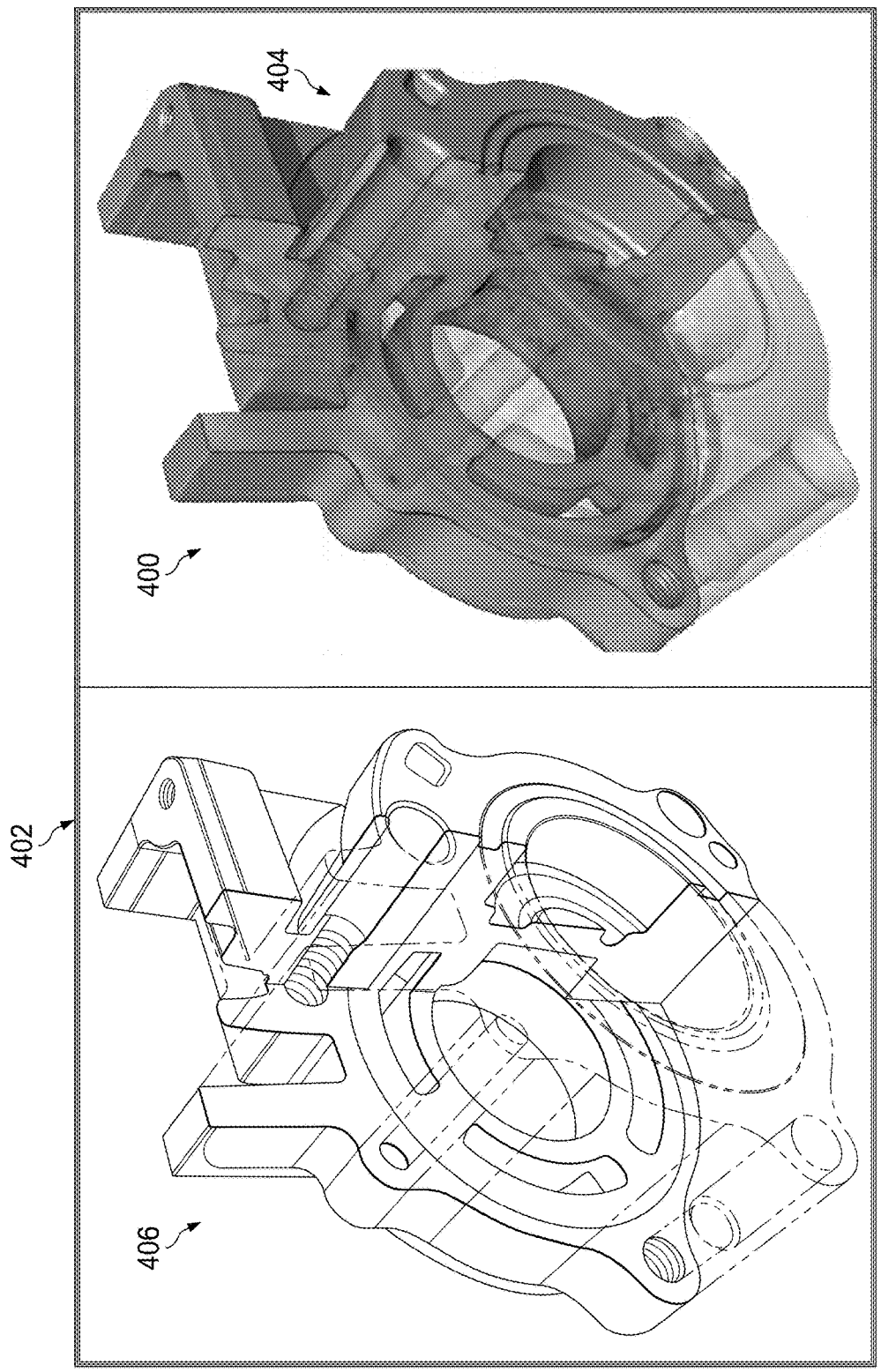
FIG. 4 is an illustration of computed tomography scan data and a model of an object in a virtual reality environment in accordance with an illustrative embodiment.

With reference next to FIG. 4, an illustration of computed tomography scan data and a model of an object in a virtual reality environment are depicted in accordance with an illustrative embodiment. In this illustrative example, virtual reality environment 400 is displayed within graphical user interface 402. As depicted, graphical user interface 402 with virtual reality environment 400 is an example of one implementation for graphical user interface 116 with virtual reality environment 134 shown in block form in FIG. 1 and FIG. 2.

As depicted, computed tomography scan data 404 and computer-aided design model 406 are displayed in virtual reality environment 400. This display is performed by game engine 135 in FIG. 1 under the control of analyzer 108 in FIGS. 1-3. As depicted, computed tomography scan data 404 and computer-aided design model 406 are displayed adjacent to each other in virtual reality environment 400. In this example, computed tomography scan data 404 and computer-aided design model 406 are displayed in a three-dimensional view.

In this illustrative example, computed tomography scan data 404 and computer-aided design model 406 are displayed in virtual reality environment 400 for an object in the form of a fitting. Within virtual reality environment 400, the operator may manipulate computed tomography scan data 404 and computer-aided design model 406. For example, the operator may rotate, translate, or otherwise move at least one of computed tomography scan data 404 or computer-aided design model 406 as displayed within virtual reality environment 400. Further, the operator may view cross-sections of at least one of computed tomography scan data 404 or computer-aided design model 406.

Figure 5:
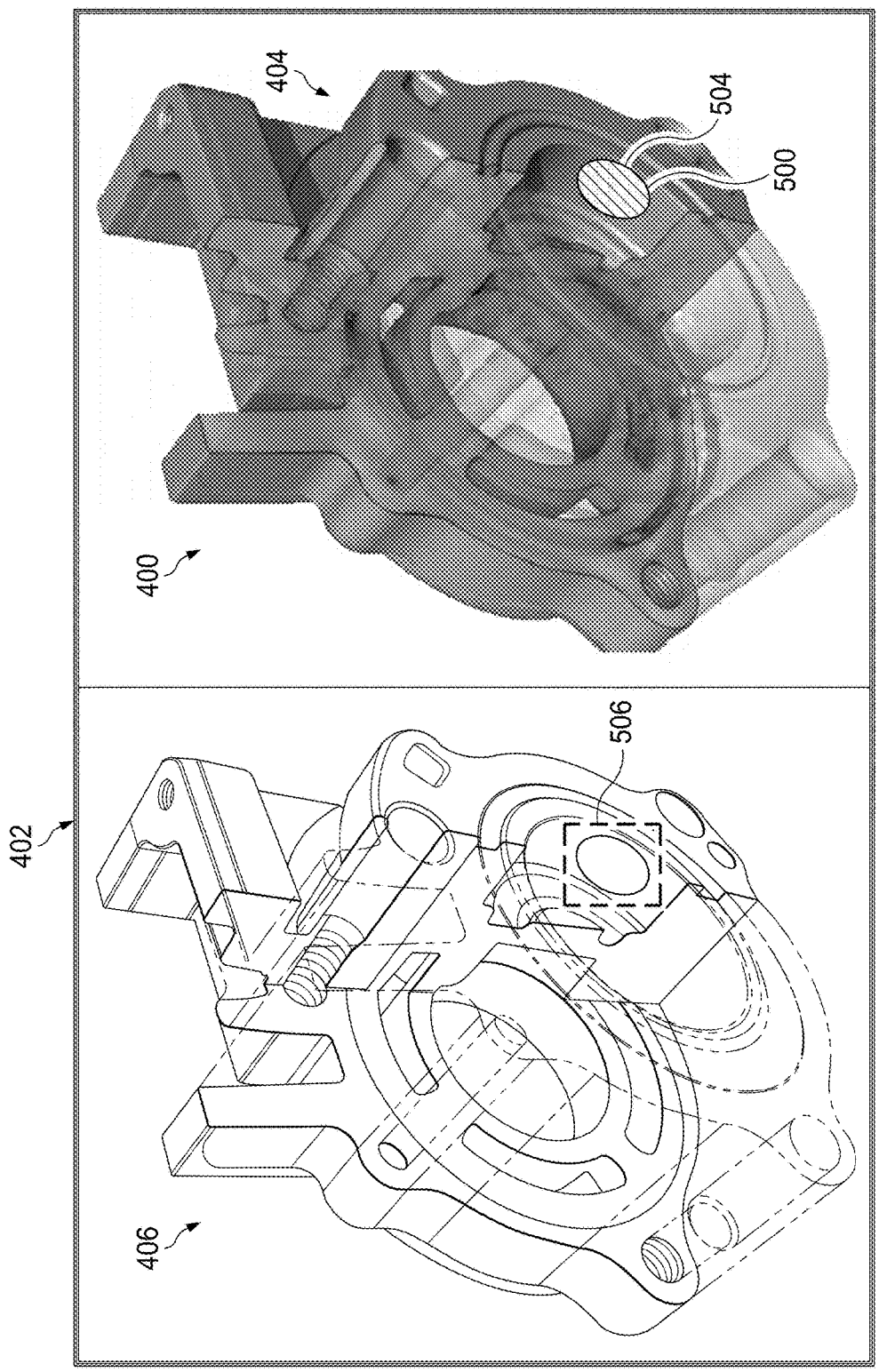
FIG. 5 is an illustration of graphical indicators indicating a difference between tomography scan data and a model of an object in a virtual reality environment in accordance with an illustrative embodiment.

With reference next to FIG. 5, an illustration of graphical indicators indicating a difference between tomography scan data and a model of an object in a virtual reality environment is depicted in accordance with an illustrative embodiment. In this example, graphical indicator 500 is displayed in association with computed tomography scan data 404. As depicted, graphical indicator 500 is a color and indicates that surface 504 for the object in computed tomography scan data 404 does not match surface 506 as desired for the object in computer-aided design model 406.

Figure 6:
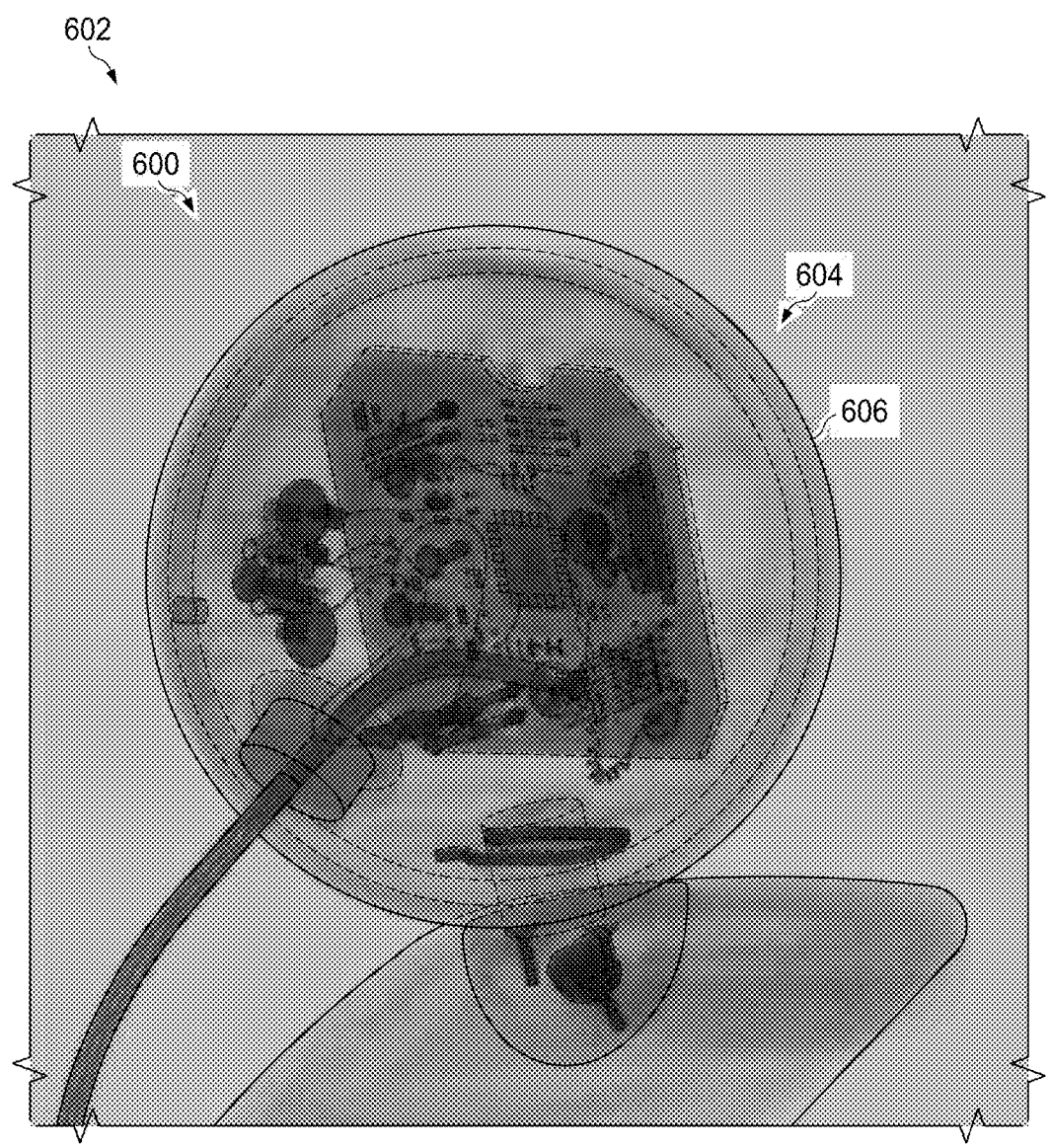
FIG. 6 is an illustration of computed tomography scan data and a model of an object in a virtual reality environment in accordance with an illustrative embodiment.

With reference next to FIG. 6, an illustration of computed tomography scan data and a model of an object in a virtual reality environment are depicted in accordance with an illustrative embodiment. In this illustrative example, virtual reality environment 600 is displayed within graphical user interface 602. As depicted, graphical user interface 602 with virtual reality environment 600 is an example of one implementation for graphical user interface 116 with virtual reality environment 134 shown in block form in FIG. 1 and FIG. 2.

As depicted, computed tomography scan data 604 and computer-aided design model 606 are displayed in virtual reality environment 600. As depicted, computed tomography scan data 604 and computer-aided design model 606 are of an object in the form of a camera. As depicted, computed tomography scan data 604 and computer-aided design model 606 are placed over each other.

Figure 7:
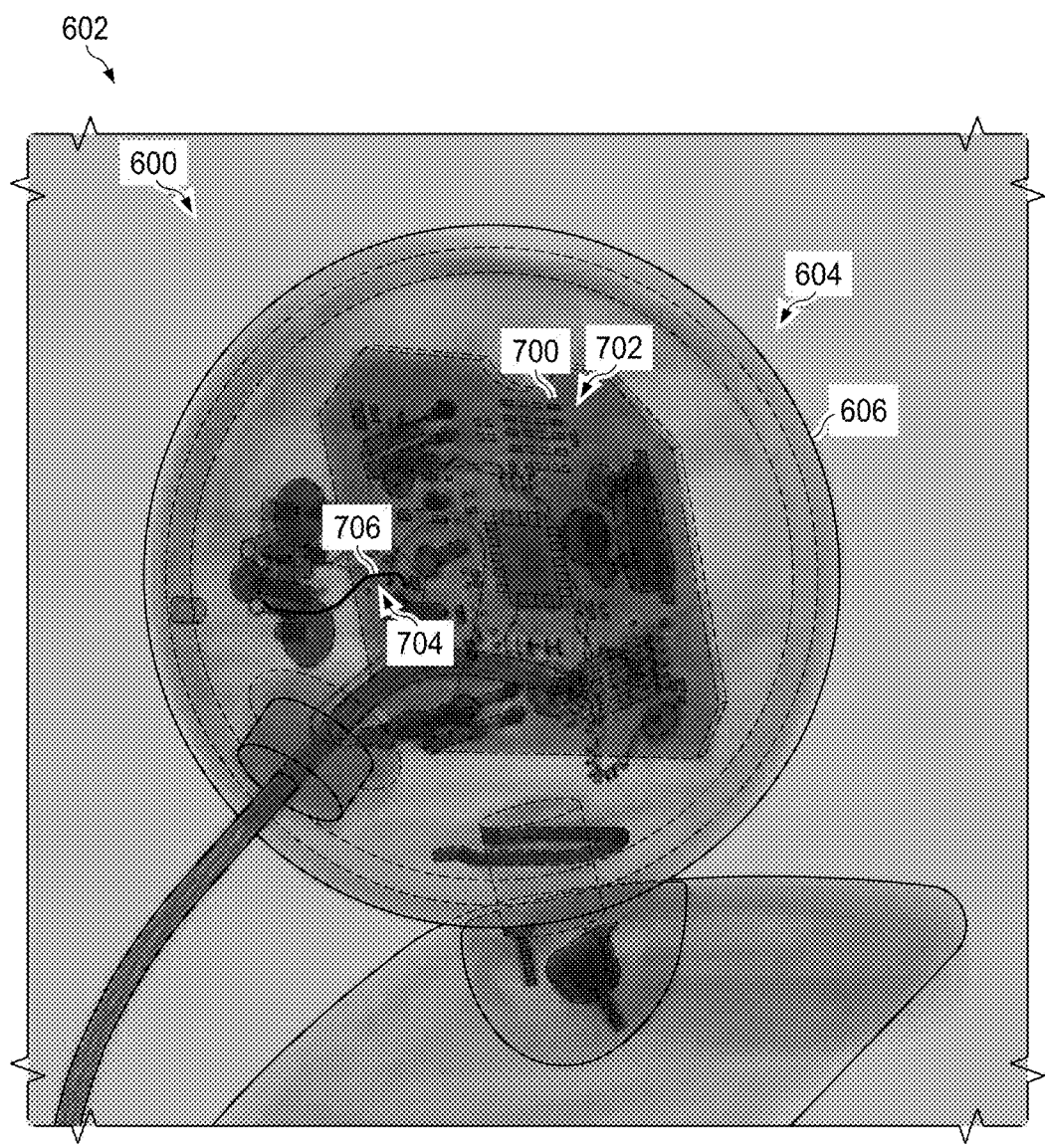
FIG. 7 is an illustration of graphical indicators indicating a difference between computed tomography scan data and a model of an object in a virtual reality environment in accordance with an illustrative embodiment.

Turning to FIG. 7, an illustration of graphical indicators indicating a difference between computed tomography scan data and a model of an object in a virtual reality environment is depicted in accordance with an illustrative embodiment. As depicted, computed tomography scan data 604 and computer-aided design model 606 are overlaid on top of each other. As depicted, graphical indicator 702 indicates that chip 700 is missing from the object and graphical indicator 704 indicates that extra wire 706 is present in the object.

The illustrations of the virtual reality environment in FIGS. 4-7 are presented as examples of implications for the display of virtual reality environment 134 in block form in FIG. 1. These illustrations are not meant to limit the manner in which virtual reality environment 134 may be displayed. For example, in FIG. 4, one or more additional sets of computed tomography scan data may be displayed in addition to computed tomography scan data 404 in FIGS. 4-5. In yet another illustrative example, other types of graphical indicators may be used other than color or lines. For example, other graphical indicators such as animation, text, icons, or other types of graphical indicators may be used.

Figure 8:
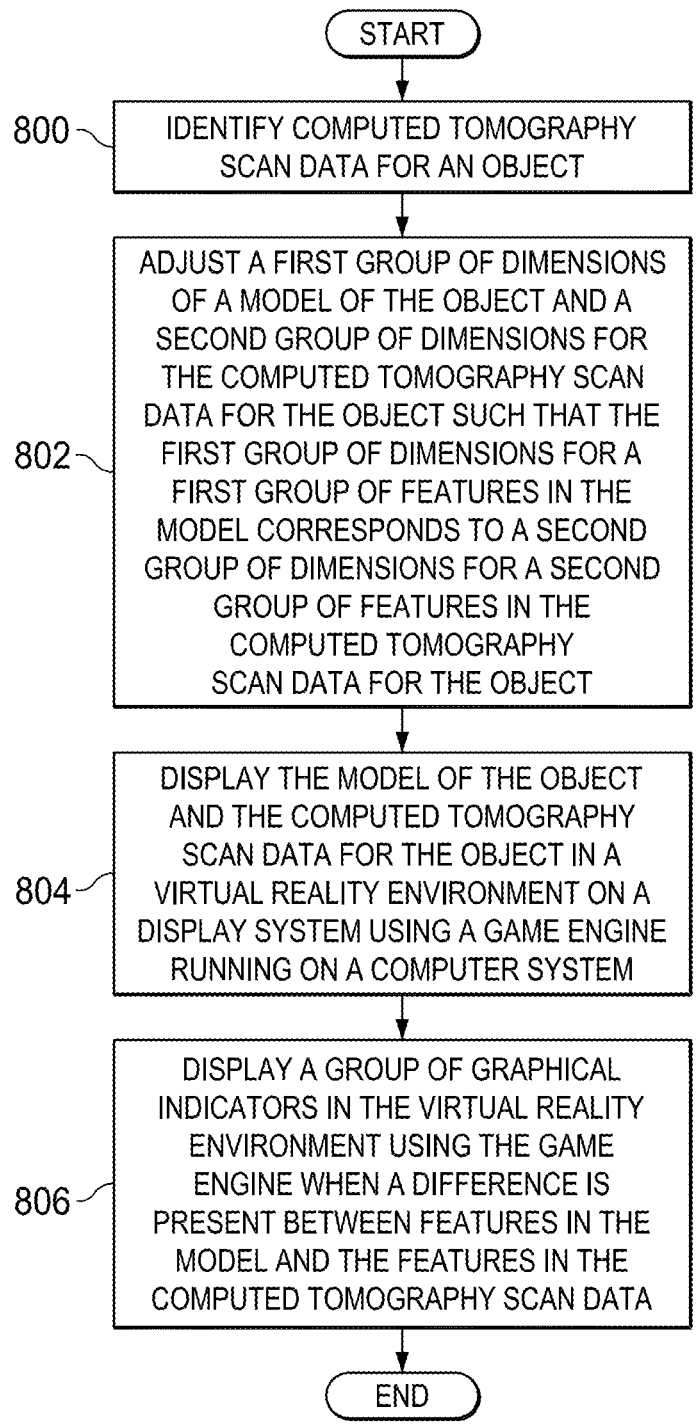
FIG. 8 is an illustration of a flowchart of a process for inspecting an object in accordance with an illustrative embodiment.

Turning next to FIG. 8, an illustration of a flowchart of a process for inspecting an object is depicted in accordance with an illustrative embodiment. The process illustrated in FIG. 8 may be implemented in analyzer 108 in FIGS. 1-3.

The process begins by identifying computed tomography scan data for an object (step 800). Next, the process adjusts a first group of dimensions of a model of the object and a second group of dimensions for the computed tomography scan data for the object such that the first group of dimensions for a first group of features in the model corresponds to a second group of dimensions for a second group of features in the computed tomography scan data for the object (step 802).

The process then displays the model of the object and the computed tomography scan data for the object in a virtual reality environment on a display system using a game engine running on a computer system (step 804). Next, the process displays a group of graphical indicators in the virtual reality environment using the game engine when a difference is present between features in the model and the features in the computed tomography scan data (step 806). The process terminates thereafter.

The process enables identifying the difference between the object and the model of the object. For example, an operator may be immersed in the virtual reality environment in which the model and the computed tomography scan data for the object are displayed. The operator may more easily identify differences between the model representing the object as desired and the computed tomography scan data representing the object as manufactured or fabricated.

Figure 9:
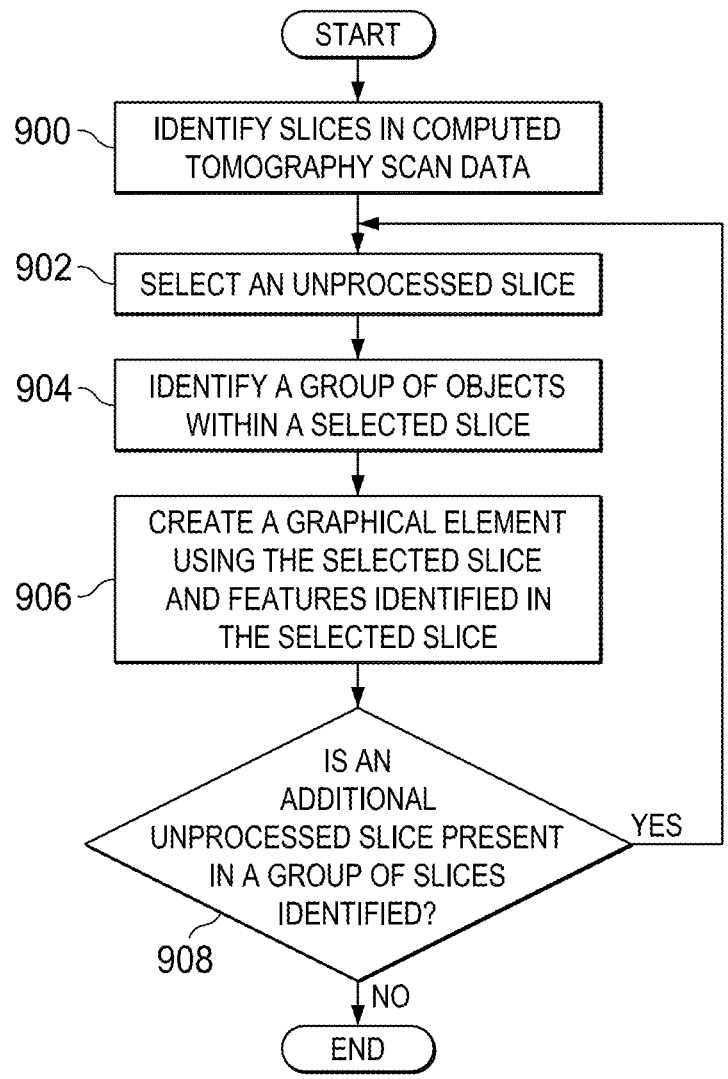
FIG. 9 is an illustration of a flowchart of a process for processing computed tomography scan data for a display in a virtual reality environment in accordance with an illustrative embodiment.

With reference next to FIG. 9, an illustration of a flowchart of a process for processing computed tomography scan data for a display in a virtual reality environment is depicted in accordance with an illustrative embodiment. The process illustrated in FIG. 9 may be implemented in analyzer 108 in FIGS. 1-3.

The process begins by identifying slices in computed tomography scan data (step 900). Next, the process selects an unprocessed slice (step 902). The process then identifies a group of objects within a selected slice (step 904). Beneficial objects within the slice may be performed using currently available object recognition techniques. A library of objects may be obtained using a model of the object for use in making comparisons to identify features in the slice.

Next, the process creates a graphical element using the selected slice and features identified in the selected slice (step 906). In this illustrative example, the graphical element may be a cuboid or some other suitable graphical element that is displayed in a virtual reality environment by a game engine.

A determination is then made as to whether an additional unprocessed sliced is present in a group of slices identified (step 908). If another unprocessed slice is present, the process returns to step 902. Otherwise, the process terminates.

Figure 10:
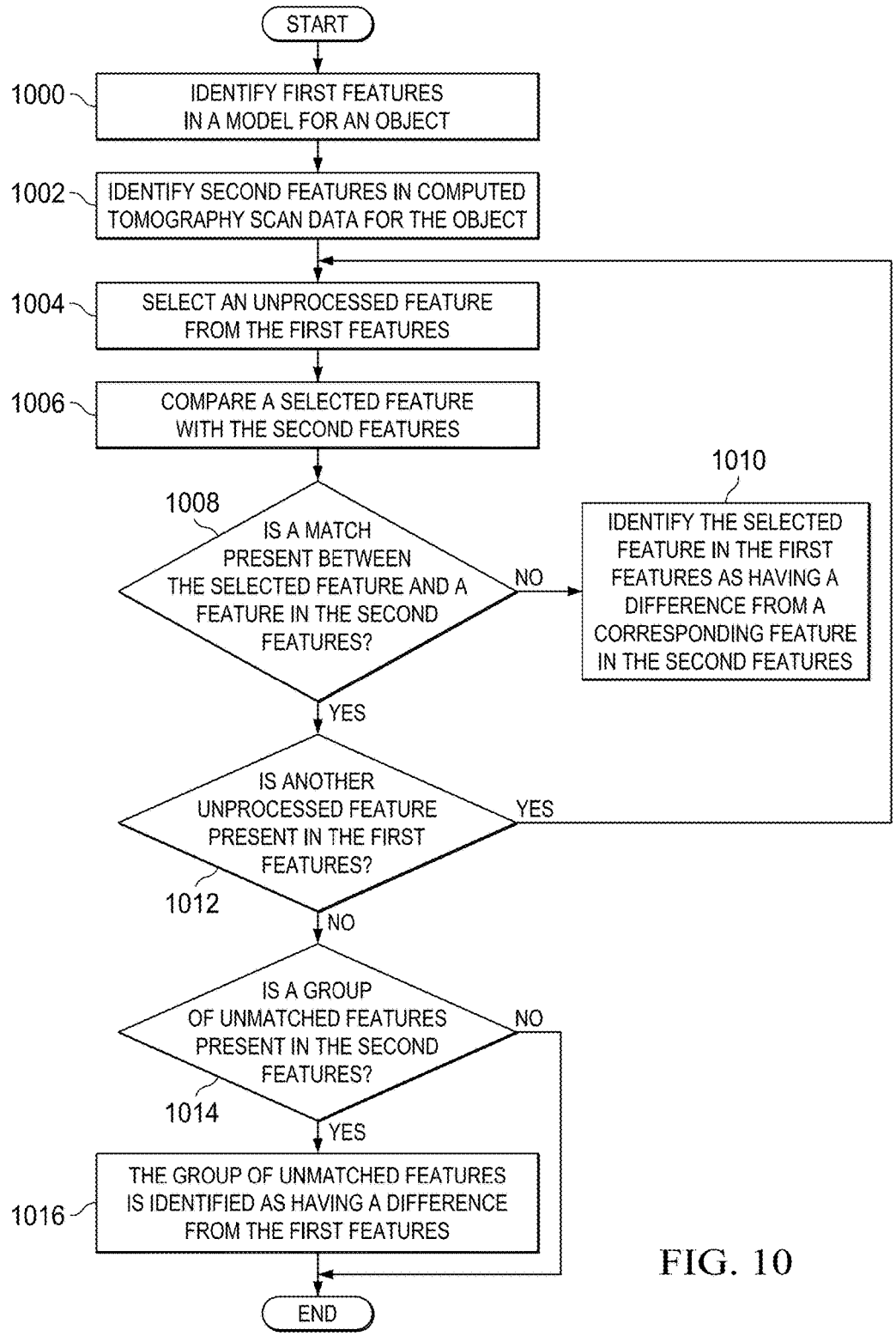
FIG. 10 is an illustration of a flowchart of a process for identifying differences between a model and computed tomography scan data for display in a virtual reality in accordance with an illustrative embodiment.

With reference next to FIG. 10, an illustration of a flowchart of a process for identifying differences between a model and computed tomography scan data for display in a virtual reality environment is depicted in accordance with an illustrative embodiment. The process illustrated in FIG. 10 may be implemented in analyzer 108 in FIGS. 1-3.

The process begins by identifying first features in a model for an object (step 1000). The process then identifies second features in computed tomography scan data for the object (step 1002). The second features may be identified using the process illustrated in FIG. 9.

Next, the process selects an unprocessed feature from the first features (step 1004). The process then compares a selected feature with the second features (step 1006). A determination is made as to whether a match is present between the selected feature and a feature in the second features (step 1008).

In this illustrative example, a match is considered to be present in step 1008 if the feature in the second features has the same shape and dimensions as the selected feature and is the corresponding location between the model and the computed tomography scan data. In the illustrative example, the feature in the second features that has the same shape and dimensions may be the selected feature if a difference between the shape and dimensions is within some specified tolerance that is considered to be acceptable.

If a match is not present, the process identifies the selected feature in the first features as having a difference from a corresponding feature in the second features (step 1010). If a match is present, the process determines whether another unprocessed feature is present in the first features (step 1012). If another unprocessed feature is present, the process returns to step 1004.

Otherwise, the process determines whether a group of unmatched features are present in the second features (step 1014). If the group of unmatched features is present in the second features, the group of unmatched features is identified as having a difference from the first features (step 1016). The process terminates thereafter. In this case, features are present in the second features for the computed tomographic scan data that are not in the first features in the model. For example, if the group of selected features in the tomographic scan data includes a chip, then the chip is an extra feature not found in the model. With reference again to step 1014, if a group of unmatched features is not preset in the second features, the process also terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
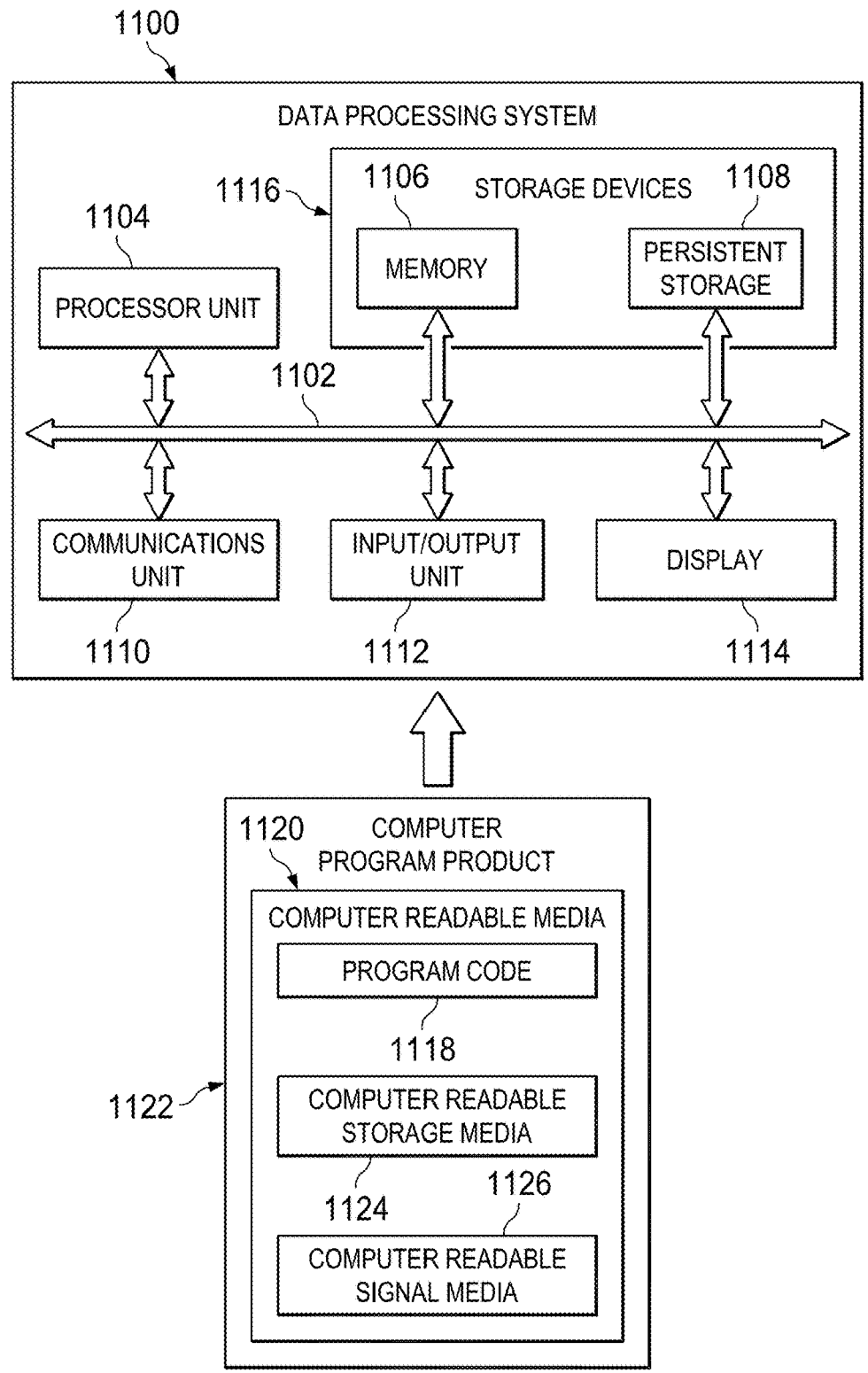
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement computer system 124 in FIG. 1. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a solid state hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these illustrative examples. In one example, computer readable media 1120 may be computer readable storage media 1124 or computer readable signal media 1126. In these illustrative examples, computer readable storage media 1124 is a physical or tangible storage device used to store program code 1118 rather than a medium that propagates or transmits program code 1118.

Alternatively, program code 1118 may be transferred to data processing system 1100 using computer readable signal media 1126. Computer readable signal media 1126 may be, for example, a propagated data signal containing program code 1118. For example, computer readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Thus, one or more technical solutions are present that overcome a technical problem with inspecting an object. One or more technical solutions in the illustrative examples may provide a technical effect of making an inspection of the object easier to view and analyze by a human operator. In one or more technical solutions, the technical effect of graphically indicating differences between a model of the object and computed tomography scan data is present. In the illustrative example, a game engine is utilized to display the model and the computed tomography scan data in a virtual reality environment. The operator viewing the virtual reality environment may have a three-dimensional view of the model and the computed tomography scan data.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for inspecting an object in a virtual reality environment, the method comprising:

identifying, by a computer system, computed tomography scan data for the object;

adjusting, by the computer system, a first group of dimensions for a model of the object and a second group of dimensions for the computed tomography scan data for the object such that the first group of dimensions for a first group of features in the model corresponds to the second group of dimensions for a second group of features in the computed tomography scan data for the object;

displaying, by a game engine running on the computer system, the model of the object and the computed tomography scan data for the object in the virtual reality environment on a display system, wherein different images are displayed to each eye of an operator such that a three-dimensional view of the model of the object and the computed tomography scan data for the object is presented in the virtual reality environment;

determining a difference between the first group of features in the model and the second group of features in the computed tomography scan data;

displaying, by the game engine running on the computer system, a group of graphical indicators in the virtual reality environment based on the difference between the first group of features in the model and the second group of features in the computed tomography scan data, wherein the group of graphical indicators indicates the difference between the second group of features in the computed tomography scan data and the first group of features in the model; and performing an operation on the object based on the difference between the first group of features in the model and the second group of features in the computed tomography scan data.

2. The method of claim 1 further comprising:
scanning the object with a computed tomography scanner.

3. The method of claim 2, wherein the computed tomography scanner is selected from one of an X-ray computed tomography (X-ray CT) scanner, a positron emission tomography (PET) scanner, and a single-photon emission computed tomography (SPECT) scanner.

4. The method of claim 1, wherein displaying the model of the object and the computed tomography scan data for the object in the virtual reality environment on the display system comprises:
displaying the model of the object and the computed tomography scan data for the object in the virtual reality environment on the display system, wherein the model and the computed tomography scan data are overlaid with each other.

5. The method of claim 1, wherein displaying the model of the object and the computed tomography scan data for the object in the virtual reality environment on the display system comprises:
displaying the model of the object and the computed tomography scan data for the object in the virtual reality environment on a display system, wherein the model and the computed tomography scan data are displayed adjacent to each other.

6. The method of claim 1, wherein the model is a computer-aided design model and further comprising:
converting a first format for the computer-aided design model into a second format used by the game engine that displays the virtual reality environment prior to displaying the model of the object in the virtual reality environment.

7. The method of claim 1 further comprising:
removing a noise in the computed tomography scan data for the object.

8. The method of claim 1, wherein the first group of features and the second group of features are selected from at least one of a part, a protrusion, a hole, an angle, a wire, a trace line, a pin, a surface of a structure, a component, a cable, a motor, an integrated circuit chip, a panel, a joint, and a seam.

9. An object inspection system comprising:
a display system; and
an analyzer, embodied in hardware, configured to identify a computed tomography scan data for an object; adjust a first group of dimensions for a model of the object and a second group of dimensions for the computed tomography scan data for the object such that the first group of dimensions for a first group of features in the model correspond to the second group of dimensions for a second group of features in the computed tomography scan data for the object; display the model of the object and the computed tomography scan data for the object in a virtual reality environment on the display system, wherein different images are displayed to each eye of an operator such that a three-dimensional view of the model of the object and the computed tomography scan data for the object is presented in the virtual reality environment; determine a difference between the first group of features in the model and the second group of features in the computed tomography scan data; and display a group of graphical indicators in the virtual reality environment based on the difference between the first group of features in the model and the second group of features in the computed tomography scan data, wherein the group of graphical indicators indicates the difference between the second group of features in the computed tomography scan data and the first group of features in the model, wherein based on difference between the first group of features in the model and the second group of features in the computed tomography scan data an operation is performed.

10. The object inspection system of claim 9 further comprising:
scanning the object with a computed tomography scanner.

11. The object inspection system of claim 10, wherein the computed tomography scanner is selected from one of an X-ray computed tomography scanner (X-ray CT), a positron emission tomography (PET) scanner, and a single-photon emission computed tomography (SPECT) scanner.

12. The object inspection system of claim 9, wherein in displaying the model of the object and the computed tomography scan data for the object in the virtual reality environment on the display system, the analyzer is configured to display the model of the object and the computed tomography scan data for the object in the virtual reality environment on the display system, wherein the model and the computed tomography scan data are overlaid with each other.

13. The object inspection system of claim 9, wherein in displaying the model of the object and the computed tomography scan data for the object in the virtual reality environment on the display system, the analyzer is configured to display the model of the object and the computed tomography scan data for the object in the virtual reality environment on the display system, wherein the model and the computed tomography scan data are displayed adjacent to each other.

14. The object inspection system of claim 9, wherein the model is a computer-aided design model and wherein the analyzer is configured to convert a first format for the computer-aided design model into a second format used by a game engine that displays the virtual reality environment prior to displaying the model of the object in the virtual reality environment.

15. The object inspection system of claim 9, wherein the analyzer is configured to remove noise in the computed tomography scan data for the object.

16. The object inspection system of claim 9, wherein the first group of features and the second group of features are selected from at least one of a surface of a structure, a component, a cable, a motor, an integrated circuit chip, a panel, a joint, a seam, and a wire.

17. An object inspection system comprising:
a computed tomography scanner that is configured to generate computed tomography scan data for an object;
a display system; and
an analyzer embodied in hardware, configured to adjust a first group of dimensions for a model of the object and a second group of dimensions for the computed tomography scan data for the object such that the first group of dimensions for a first group of features in the model correspond to a second group of dimensions for a second group of features in the computed tomography scan data for the object; display the model of the object and the computed tomography scan data for the object in a virtual reality environment on the display system using a game engine, wherein different images are displayed to each eye of an operator such that a three-dimensional view of the model of the object and the computed tomography scan data for the object is presented in the virtual reality environment; determine a difference between the first group of features in the model and the second group of features in the computed tomography scan data; and display a group of graphical indicators in the virtual reality environment using the game engine based on the difference between the first group of features in the model and the second group of features in the computed tomography scan data, wherein the group of graphical indicators indicates the difference between the second group of features in the computed tomography scan data and the first group of features in the model, wherein based on the difference between the first group of features in the model and the second group of features in the computed tomography scan data an operation is performed.

18. The object inspection system of claim 17, wherein the analyzer is configured to control a computed tomography scanner to scan the object.

19. The object inspection system of claim 17, wherein the model is a computer-aided design model and wherein the analyzer is configured to convert a first format for the computer-aided design model into a second format used by an engine that displays the virtual reality environment prior to displaying the model of the object in the virtual reality environment.

20. The object inspection system of claim 17, wherein in displaying the model of the object and the computed tomography scan data for the object in the virtual reality environment on the display system, the analyzer is configured to display the model of the object and the computed tomography scan data for the object in the virtual reality environment on the display system using the game engine, wherein the model and the computed tomography scan data are displayed adjacent to each other.

* * * * *